United States Patent [19]

Laqua et al.

[11] 4,113,701

[45] Sep. 12, 1978

[54] METHOD FOR THE PREPARATION OF HARDENABLE UREA FORMALDEHYDE RESINS

[75] Inventors: Arnold Laqua; Ulrich Holtschmidt, both of Essen, Fed. Rep. of Germany

[73] Assignee: Th. Goldschmidt AG, Essen, Fed. Rep. of Germany

[21] Appl. No.: 793,315

[22] Filed: May 3, 1977

[30] Foreign Application Priority Data

May 8, 1976 [DE] Fed. Rep. of Germany ....... 2620478

[51] Int. Cl.$^2$ ..................... C08G 14/08; C08G 14/10; G08G 12/12

[52] U.S. Cl. .............................. 260/29.4 R; 528/256; 528/69 R; 528/70 R; 528/256

[58] Field of Search .............. 260/67.6 R, 70 A, 70 R

[56] References Cited

U.S. PATENT DOCUMENTS

| | | | |
|---|---|---|---|
| 2,688,607 | 12/1951 | Suen | 260/67.6 R |
| 3,645,973 | 2/1972 | Schibler | 260/67.6 R |
| 3,793,280 | 2/1974 | Sandler | 260/67.6 R X |
| 3,816,376 | 6/1974 | Brunnmueller et al. | 260/69 R |
| 3,933,755 | 1/1976 | Michaud et al. | 260/67.6 R |
| 3,985,696 | 10/1976 | Aignesberger et al. | 260/69 R X |

*Primary Examiner*—John C. Bleutge
*Attorney, Agent, or Firm*—Toren, McGeady and Stanger

[57] ABSTRACT

A method for the preparation of solutions of hardenable urea-formaldehyde resins which are suitable for impregnating paper supports used for coating wood-based panels wherein urea and formaldehyde are first mixed in specific mole ratios and reacted for a period of time to a given viscosity, an aminosulfonic acid is then added and the pH is controlled with ammonia to further react the mixture and finally, additional ammonia and urea are added to produce the final viscosity product wherein a portion of the initial urea is replaced with a melamine which results in significant improvements in the temperature and pH control of the process.

1 Claim, No Drawings

METHOD FOR THE PREPARATION OF HARDENABLE UREA FORMALDEHYDE RESINS

BACKGROUND OF THE INVENTION

1. Field of The Invention

The present invention relates to a process for the preparation of solutions of hardenable urea-formaldehyde resins, especially of resins for impregnating paper supports used for coating wood-based panels.

2. Description of The Prior Art

There is an extensive literature that deals with processes for the preparation of urea-formaldehyde precondensation resins and their properties. Special reference is made in this connection to the summarizing monograph of J. Scheiber, "Chemie und Technologie der kunstlichen Harze (Chemistry and Technology of the Synthetic Resins)", 1943 edition, page 333 ff. and to the corresponding section in Houben-Weyl, volume 14/2, page 319 ff., 1963 edition.

However, the urea-formaldehyde resins known conventionally have a series of disadvantages. These disadvantages are especially evident from the fact that urea resins harden relatively slowly in the pH region above about 4, while at a pH region below 4 then tend, to harden more rapidly and, in fact, relatively precipitously and therefore, uncontrollably.

If compounds, such as, latent hardeners are used which lead to strongly acidic reactions, hardened products are obtained which, as a result of excessively rapid hardening, are very brittle and, in cases where they are used for coating the surface of wood-based panels, produce surfaces which tend to crack. If, however, hardeners are used which lead to weakly acidic reactions, such as, for example, most of the amine salts of organic acids, one must be prepared to put up with a relatively long hardening times or high hardening temperatures. Even then, products are obtained in many cases which contain portions of resin which have not been hardened, in addition to hardened duroplastic polycondensation portions.

This hardening behavior is associated with a series of disadvantages from an applications point of view. Thus, resins hardened with strongly acidically acting latent hardeners tend to be brittle and do not produce satisfactory surfaces when wood-based panels are coated with these resins at processing temperatures above 120° C because of the rapid hardening. Moreover, resins hardened with amine salts of carboxylic acids have little resistance to the detrimental effects of water and temperature, since the proportion of resin, which has not completely hardened is relatively large.

Attempts to improve the duroplastic properties of urea-formaldehyde resins by increasing the hardening temperature have failed because of the decomposition of urea-formaldehyde resins, which clearly becomes evident at temperatures from 120° C upwards. The above-described hardening characteristics of urea-formaldehyde resins interfere particularly with the use of these resins for coating surfaces in so-called short-contact presses, in which the urea-formaldehyde resin can be exposed for short times to temperatures up to 150° C. The hardening times conventionally used are too short for converting the resin completely to the duroplastic state. On the other hand, the press temperatures are already so high that the thermal instability of the urea-formaldehyde resin becomes a problem.

In this regard, German Patent Application No. P 24 48 472.8 (Belgian Patent No. 834,032) is noted which involves a process for the preparation of urea-formaldehyde solutions wherein an aqueous solution prepared according to the following procedure is used:

(a) urea and formaldehyde, in a mole ratio of 1 : 1.5 to 2.5, are reacted in the presence of 0.2 to 1.0 mmoles of an aminosulfonic acid and 20 to 100 mmoles of ammonia (in each case based on 1 mole of urea) at temperatures of 70° to 95° C for 10 to 30 minutes, until the 50% solution has a viscosity of 55 to 65 cP at 20° C;

(b) 0.8 to 10 mmoles of an aminosulfonic acid are then added, a pH of 4.0 to 4.5 is maintained with ammonia during the reaction time of 10 to 25 minutes at 70° to 95° C, until the 50% solution has a viscosity at 20° C of 80 to 110 cP; and finally, (c) 40 to 200 mmoles of ammonia, as well as 0.1 to 0.3 moles of urea are added to this reaction product and the reaction mixture is converted in 15 to 45 minutes at a temperature of 70° to 95° C until the 50% solution has a viscosity of 85 to 125 cP at 20° C.

While the purpose of the above process is to overcome the above noted difficulties of the prior art, there are, however, a number of problems with this procedure especially in the case of large batches. Thus, the reaction of Step (a) is rather difficult to control because of the exothermic nature of the process, especially when, for example, because of the equipment an efficient heat dispersion cannot be achieved without difficulty. It was furthermore discovered that, for Step (b), maintaining the pH at 4.0 to 4.5 creates difficulties, since the pH has a tendency to decrease, so that a constant, controlled addition of ammonia is required. This, however, impairs the simplicity of the aforementioned process.

SUMMARY OF THE INVENTION

It is an object of the invention to provide a urea resin, whose hardening characteristics are so constituted, that it can be converted quantitatively and in a controlled manner into the duroplastic state, within the times prescribed by the present application's technology. At the same time, the flow properties of the resin, until it hardens, are so constituted that satisfactory surface coatings result. In addition, the resins used have an improved temperature and water stability as well as adequate crack resistance, without impairment of their impregnating properties, that is, the wetting and penetration of the cellulose fibers of the support material.

It is a further object of the invention with respect to the process of German Patent Application No. P 24 48 472.8, to phlegmatize or desensitize the reaction of Step (a) to make it easier to control and, if possible, to maintain the pH value in Step (b), once it has been adjusted.

We have discovered that this and the above objects can be accomplished by replacing, in Step (a), 0.01 to 0.05 moles of the urea with equimolar amounts of melamine.

DESCRIPTION OF THE PREFERRED EMBODIMENT

It is known in the art that mixtures of aminoplast resin formers may be used in the preparation of aminoplast resins and in particular, that mixtures of urea and melamine may be condensed with formaldehyde. The object here is either, when starting from melamine resins, to produce these more cheaply by partially replacing melamine with urea or, when starting with urea, to improve the industrial applications properties of urea resins through melamine. This is well known to those experienced in the art, since melamine resins or melamine-rich urea resins have better end use properties, in particular, a better resistance to the effects of water and temperature. In order to achieve these properties, it is necessary, however, to replace at least 0.3 moles of the urea with melamine, and, as a rule, even higher contents of melamine have an advantageous effect on the end use properties.

In contrast to this prior known procedure, only 0.01 to 0.05 moles of urea are replaced by melamine in the inventive process. These amounts cause no change in the final properties of the hardened resin. Surprisingly however, these slight amounts phlegmatize, e.g., desensitize the reactivity of the first step of the three-step process and maintain the pH of the second step at a constant value. Such an effect on the course of the reaction could however not have been foreseen and represents a significant advantage over the known process, since the first step of the three-step process now remains controllable even in large batches and a continuous pH check during the resin synthesis in the second step is no longer necessary.

This is accomplished while retaining the advantageous end use properties of the resin manufactured according to the process.

The inventive process is explained in greater detail by means of the following examples.

EXAMPLE 1 (COMPARISON EXAMPLE)

1136 kg of a 37% formalin solution and 2 kg of a 20% amidosulfonic acid solution are added to a 3000 l stirred reactor, equipped with a reflux condenser and device for measuring temperature and pH continuously. After the further addition of 16 kg of a 25% aqueous ammonia solution and 420 kg of urea, whereby the pH in the reaction mixtures is adjusted to 8 at 20° C, the batch is heated with vigorous stirring to 90° C. A vigorous, exothermic reaction takes place and, even with immediate intensive cooling, heats the reaction batch in a few minutes to a state of vigorous boiling. After a relatively short reaction time, the pH of the reaction mixture, measured at 90° C, has fallen to 5.6 and the viscosity has reached a value of 60 cP. The vigorous, exothermic reaction is very difficult to control. The reaction batch is now treated with 6 kg of a 20% amidosulfonic acid solution, whereby the pH of the reaction mixture at 90° C is adjusted to a value of 3.8. By adding 6 kg of a 25% aqueous ammonia solution, the pH, measured at 90° C is raised to 4.4. During the reaction time (20 minutes) in the acid pH range that is necessary now, aqueous 25% ammonia solution must be added constantly in order to maintain the pH at 4.4. If the pH is not corrected, it falls to values less than 3.5 and causes a strongly exothermic condensation reaction, which makes the reaction batch unsuitable for use as an impregnating resin.

After 20 minutes of reaction time at a pH of 4.4, the viscosity of the reaction mixture, measured at 20° C, rises to 90 cP. In order to continue the reaction, the resin batch is treated with 60 kg of urea as well as 50 kg of a 25% aqueous ammonia solution, whereby a pH of 6.5, measured at 85° C, results in the reaction mixture. The temperature is again raised to 90° C and the batch is reacted for a further 20 minutes at this temperature. When cooled to 20° C, the urea-formaldehyde resin is slightly cloudy, has a pH of 7.2 and a viscosity of 95 cP.

EXAMPLE 2

1136 kg of a 36% formalin solution and 2 kg of a 20% amidosulfonic acid solution are added to a reactor similar to that in Example 1. After the further addition of 16 kg of a 25% aqueous ammonia solution, 400 kg of urea and 20 kg of melamine, the pH in the reaction mixture, measured at 20° C, is 8.0. The batch is now heated to 90° C with good stirring.

In comparison with Example 1, the exothermic reaction is hardly noticeable in this batch. Within the first 10 minutes of reaction time after reaching 90° C, the temperature rises slowly to 92° C though the batch is not being cooled. After a further 10 minutes of reaction at 90° to 92° C, the pH of the reaction medium, measured at 90° C, has fallen to 5.8 and the viscosity has reached a value of 57 cP.

As in Example 1, the reaction batch is treated with 6 kg of a 20% aqueous amidosulfonic acid solution (pH of 3.7 at 90° C) and 6 kg of a 25% aqueous ammonia solution. The pH of the batch now lies at 4.5 (measured at 90°) and remains almost constant during 20 minutes of reaction time under the given conditions. In comparison to Example 1, no pH correction is required during this acid, intermediate condensation. After the 20 minutes of reaction time, the batch has a pH of 4.3 and a viscosity of 95 cP (20° C).

The resin synthesis is concluded as in Example 1. A mildly cloudy urea-formaldehyde resin results with a pH of 7.3 and a viscosity of 90 cP, each measured at 20° C.

EXAMPLE 3

A urea resin is prepared by the three-step synthesis described, as in Example 2, but using 410 kg of urea instead of 400 kg and 10 kg of melamine instead of 20 kg.

Even using only 10 kg of melamine in the resin synthesis, the exothermic reaction in the first synthesis step does not interfere. The temperature rises from 90° to 93° C as a result of the exothermic reaction and the batch can be kept well under control.

Moreover, the use of 10 kg of melamine has a stabilizing effect on the pH (4.5 at 90° C) during the second synthesis step for the 20 minutes of reaction time. Without any adjustment, the pH, measured at 90° C, falls during this reaction time to only 4.2.

The resin synthesis is concluded as in Example 1. A mildly cloudy urea resin is obtained with a pH of 7.5 and a viscosity of 100 cP, each measured at 20° C.

Having thus described our invention, what is claimed is:

1. In a process for the preparation of solutions of hardenable urea-formaldehyde resins suitable for impregnating and coating paper supports for coating the surface of wood-based panels wherein
  (a) an aqueous solution of urea and formaldehyde in a mole ratio of 1 : 1 to 2.5 are reacted for 10 to 30 minutes at 70° to 95° C in the presence of 0.2 to 1.0 mmoles of an aminosulfonic acid and 20 to 100 mmoles of ammonia, each based on 1 mole of urea, until the 50% solution has a viscosity of 55 to 65 cP at 20° C;
  (b) 0.8 to 10 mmoles of an aminosulfonic acid are then added, and a pH of 4.0 to 4.5 is maintained by ammonia addition during a reaction time of 10 to 25 minutes at 70° to 95° C, until the 50% solution has a viscosity of 80 to 110 cP at 20° C, and then;

(c) the reaction product from step (b) is treated with 40 to 200 mmoles of ammonia as well as 0.1 to 0.3 moles of urea and the reaction mixture is reacted at a temperature of 70° to 95° C for 15 to 45 minutes, until the 50% solution has a viscosity of 85 to 125 cP at 20° C.

the improvement which comprises replacing from 0.01 to 0.05 moles of the urea in step (a) with equimolar amounts of melamine.

* * * * *